(No Model.) 2 Sheets—Sheet 2.
R. K. WELCH.
DYNAMO ELECTRIC MACHINE OR ELECTRIC MOTOR.
No. 520,152. Patented May 22, 1894.
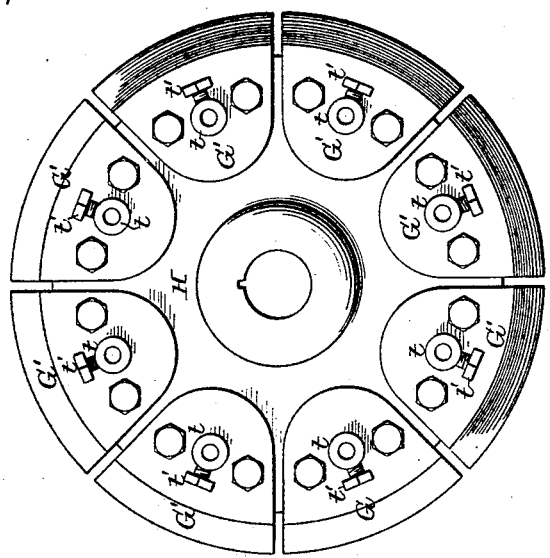
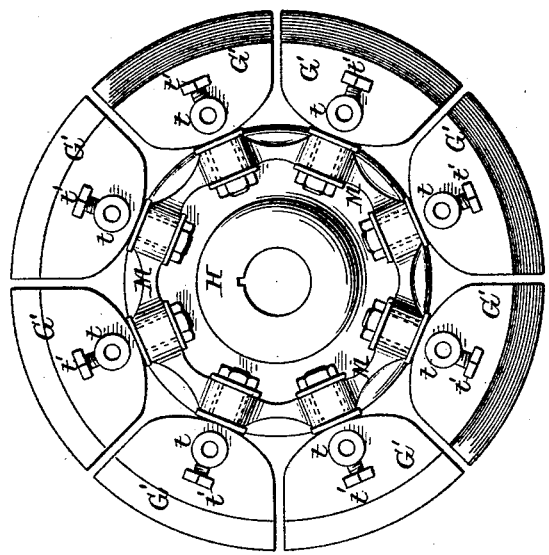
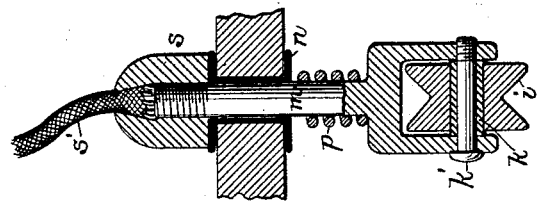
Witnesses:
Fred D Goodwin.
A. V. Groupe.
Inventor:
Robert Kemp Welch
by his Attorneys
Howson & Howson

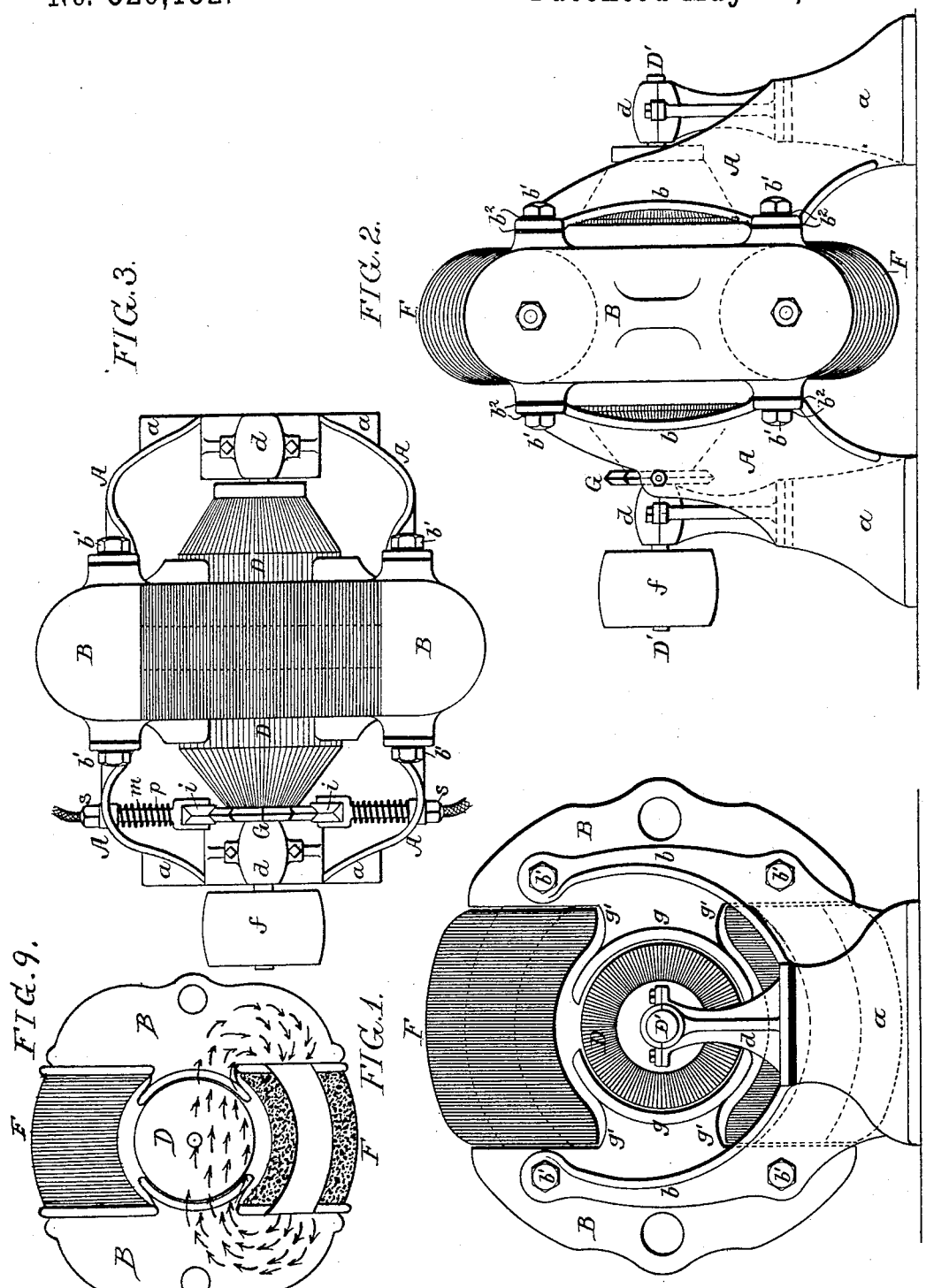

UNITED STATES PATENT OFFICE.

ROBERT KEMP WELCH, OF PHILADELPHIA, PENNSYLVANIA, ASSIGNOR OF ONE-HALF TO GEORGE E. SCHLEGELMILCH, OF SAME PLACE.

DYNAMO-ELECTRIC MACHINE OR ELECTRIC MOTOR.

SPECIFICATION forming part of Letters Patent No. 520,152, dated May 22, 1894.

Application filed June 24, 1891. Serial No. 397,278. (No model.)

*To all whom it may concern:*

Be it known that I, ROBERT KEMP WELCH, a citizen of the United States, and a resident of Philadelphia, Pennsylvania, have invented certain Improvements in Dynamo-Electric Machines or Electric Motors, of which the following is a specification.

The object of my invention is to construct an electric motor or dynamo-electric machine, possessing effective pole pieces and field magnets, and provided with a compact, light, and easily insulated form of supporting frame, and a commutator and current collector of simple construction which occupies but a short space in the length of the shaft, can be readily repaired and permits of the collection and discharge of the current with less friction and sparking than usual, because of the good commutator contacts and the good electric conductivity in the parts between the commutator and the terminal or binding post. This object I attain in the manner hereinafter set forth, reference being had to the accompanying drawings, in which—

Figure 1, is an end view of a dynamo electric machine or electric motor constructed in accordance with my invention. Fig. 2, is a side elevation of the same. Fig. 3, is a plan view of the same. Fig. 4, is an enlarged sectional view of one of the current collectors of the commutator. Figs. 5 and 6, are side views of different forms of commutator embodying my invention; and Figs. 7 and 8, are sections, respectively, of the commutators shown in Figs. 5 and 6. Fig. 9, is a diagram illustrating one of the features in the construction of the field magnet.

In Figs. 1, 2 and 3, A A represent the opposite supporting frames of my improved dynamo electric machine or electric motor, each of these frames consisting of the base or pedestal *a*, from each side of which projects upwardly a flanged arm *b*, these arms carrying the pole pieces B of the machine to which they are secured by suitable transverse bolts $b'$, insulating washers $b^2$ being interposed between the frame and the pole pieces and bolts as shown in Fig. 2. Mounted upon the pedestals *a* of the opposite end frames are the bearings *d* for the shaft $D'$ of the armature D on which shaft is a driving or driven pulley *f*. The opposite pole pieces are connected by segmental bars as shown by dotted lines in Fig. 1, and these bars constitute the cores for the field magnets F F the wires of which are wound around said cores in planes parallel with a single radial line carried from the axis of the armature shaft through the center of the field magnet so that the field magnets are segmental in outline with straight parallel ends. The pole pieces have inwardly projecting portions *g* which are shaped to accord with the periphery of the armature and the inner contour of the field magnets, that is to say, they are recessed as at $g'$ for the reception of the end portions of said field magnets, the inner projecting portions of the pole pieces extending around the armature throughout any desired portion of the semi-circular arc. The segmental cores of the field magnets are contracted in length so that they terminate at each end at points above the horizontal plane of the armature and thereby lie in the path of the lines of force taking the shortest possible course through the armature and field, as indicated by the arrows in Fig. 9, thus preventing the objectionable deflection of the current which results when the armature cores almost completely encircle the armature. The commutator G is in the form of a flat disk having a periphery which is, by preference, V-shaped, although it may be convex if desired, or even flat, or on the other hand may have a V-shaped, concave, or other groove formed in it. The current collectors, which take the place of the usual brushes, are in the form of antifriction rollers *i* shaped to accord with the shape of the periphery of the commutator, each of these rollers being hung to and free to turn on a sleeve *k*, which is clamped by an internal transverse bolt $k'$ to the forked inner end of a sliding rod *m*, the latter being guided in a non-conducting sleeve *n* in one of the arms of the supporting frame, and being acted upon by a spring *p* tending to maintain the collector *i* in close contact with the periphery of the commutator. The outer end of the rod *m* is threaded for the reception of a cap *s* which receives the end of the wire or cable $s'$ leading to the terminal or binding post of the machine, so that on screwing up this cap said wire or cable will be pressed firmly into contact with the end of the rod and a good electrical connection thereby insured. The contact roller, its bushing sleeve, the clamp bolt and the rod $m$, and, by preference also the threaded cap, are made of copper or other metal possessing good electrical conductivity, so that the free flow of current from the commutator to the binding post or terminal of the machine is insured. If desired the wire or cable $s'$ may be permanently secured to the end of the rod $m$ by soldering or otherwise, but the use of the confining cap $s$ is preferred. The commutator is composed of a series of segments $G'$ each secured in its proper position upon a carrier H properly secured to the armature shaft, and each of said segments $G'$ has a hollow stud $t$ and set screw $t'$ on the side adjacent to the armature, so as to provide for a good electrical connection between the commutator and the wires of the armature winding. The carrier of the commutator may consist of a simple disk as shown in Figs. 5 and 7, the commutator sections or segments being bolted upon one face of such disk if the same is of non-conducting material, or if the disk is of metal the commutator sections being properly insulated therefrom by interposed insulating material $v$. The form of commutator which I prefer, however, is that shown in Figs. 6 and 8, in which the carrier is in the form of a disk having a laterally projecting ring or flange M in which are openings for the reception of threaded stems $w$ formed on or secured to the segments $G'$, these stems being secured to the flange by suitable nuts $w'$ and being properly insulated from said flange by insulating washers and sleeves $w^2$. It will be evident that a series of projecting lugs, one for each segment of the commutator, might be used in place of the continuous flange, and such lugs are therefore regarded as the equivalent of the flange.

Having thus described my invention, I claim and desire to secure by Letters Patent—

1. The combination of the armature, field magnets and pole pieces, with the end frames having supporting bases upon which are mounted pedestals for the support of the shaft bearings, and opposite arms projecting upward and outward from the bases and carrying the pole pieces, substantially as specified.

2. The combination of the commutator with the current collector consisting of an anti-friction roller, a bearing sleeve for the same, a forked rod and clamp screw carrying said sleeve, and a spring for projecting said rod, the sleeve being slightly longer than the width of the roller whereby the forks of the rod are prevented from confining said roller substantially as specified.

3. The combination of the commutator with the current collector, consisting of an anti-friction roller, a forked rod carrying the same, a spring for projecting the rod, and a cap applied to the end of the rod and serving to confine the conductor to the end of the rod, in direct line with the rod substantially as specified.

4. The commutator consisting of a central disk-like carrier constructed for application to the armature shaft, and a series of segments secured to and projecting radially beyond said carrier, so as to provide a narrow bearing for the current collector substantially as specified.

5. The commutator consisting of a central disk-like carrier constructed for application to the armature shaft, and a series of segments secured to and projecting radially beyond said carrier and each having a stud and binding screw for the reception of wires of the armature wind, substantially as specified.

6. The commutator consisting of a central disk constructed for application to the armature shaft, and having a projecting flange, and segments each having a stem passing through an opening in said flange, and having a confining nut and means for insulating the said stem from the flange, substantially as specified.

In testimony whereof I have signed my name to this specification in the presence of two subscribing witnesses.

ROBERT KEMP WELCH.

Witnesses:
EUGENE ELTERICH,
HARRY SMITH.